(12) United States Patent
Punz

(10) Patent No.: US 9,516,577 B2
(45) Date of Patent: Dec. 6, 2016

(54) DYNAMIC ACTIVATION OF ANDSF POLICIES

(71) Applicant: NEC EUROPE LTD., Heidelberg (DE)

(72) Inventor: Gottfried Punz, Vienna (AT)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/415,631

(22) PCT Filed: Jul. 22, 2013

(86) PCT No.: PCT/EP2013/065385
§ 371 (c)(1),
(2) Date: Jan. 19, 2015

(87) PCT Pub. No.: WO2014/013085
PCT Pub. Date: Jan. 23, 2014

(65) Prior Publication Data
US 2015/0156705 A1    Jun. 4, 2015

(30) Foreign Application Priority Data
Jul. 20, 2012  (EP) .................................. 12177338

(51) Int. Cl.
*H04W 48/10*  (2009.01)
*H04W 8/20*  (2009.01)
*H04W 48/18*  (2009.01)

(52) U.S. Cl.
CPC ............... *H04W 48/10* (2013.01); *H04W 8/20* (2013.01); *H04W 48/18* (2013.01)

(58) Field of Classification Search
CPC ........ H04W 8/20; H04W 48/00; H04W 48/08; H04W 48/10
See application file for complete search history.

(56) References Cited

U.S. PATENT DOCUMENTS

2012/0127974 A1* 5/2012 Doppler ................ H04W 76/02
  370/338
2013/0034019 A1* 2/2013 Mustajarvi ............ H04W 48/16
  370/254

FOREIGN PATENT DOCUMENTS

EP  2445266 A1  4/2012

OTHER PUBLICATIONS

Huawei: "Auto Selection Activation", 3GPP Draft; C1-091770, 3rd Generation Partnership Project (3GPP), Apr. 27, 2009, XP050337373.
Janne Tervonen et al: "Realization of Policy-Based Resource Management Concept-Future Internet Program of TIVIT", Feb. 16, 2010, pp. 1-39, XP055105769.

(Continued)

*Primary Examiner* — Anh Ngoc Nguyen
(74) *Attorney, Agent, or Firm* — Leydig, Voit & Mayer, Ltd.

(57) ABSTRACT

A method for managing ANDSF policies in a 3GPP access network includes defining ANDSF rules and structuring the ANDSF rules into sets of ANDSF policies. A set identifier is defined for each set of the ANDSF policies as an ANDSF Set-ID. The ANDSF Set-IDs are conveyed to targeted UEs via a 3GPP control plane. The sets of the ANDSF policies are provisioned to the targeted UEs. A respective one of the ANDSF Set-IDs is provided such that it is used by UE logic in order to apply the respective ANDSF policy.

16 Claims, 3 Drawing Sheets

(56) References Cited

OTHER PUBLICATIONS

NEC: "Analysis and discussion of UPCON solution elements (additional considerations)", 3GPP Draft; S2-130404 UPCONDISC2, 3$^{rd}$ Generation Partnership Project (3GPP), vol. SA WG2, No. Prague, Czech Republic, Jan. 22, 2013, XP050684936.
KDDI: "UPCON solution framework for RAN user plane congestion", 3GPP Draft; S2-130287, vol. SA WG2, No. Prague, Czech Republic, Jan. 22, 2013, XP050684829.
Magnus Olsson et al: "Architecture Overview—2.1 EPS Architecture" In: "EPC and 4G Packet Networks", Jan. 1, 2013, Elsevier, XP055105843, pp. 17-64.
ETSI TS 124 302, "Universal Mobile Telecommunications System (UMTS); LTE; Access to the 3GPP Evolved Packet Core (EPC) via non-3GPP access networks; Stage 3 (3GPP TS 24.302 version 10.7.0 Release 10)", Mar. 2012, pp. 1-61.
3GPP TS 24.312 V11.3.0, 3$^{rd}$ Generation Partnership Project; Technical Specification Group Core Network and Terminals; Access Network Discovery and Selection Function (ANDSF) Management Object (MO) (Release 11), Jun. 2012, pp. 1-162.
ETSI TS 124 008, Digital cellular telecommunications system (Phase 2+); Universal Mobile Telecommunications System (UMTS); LTE; Mobile radio interface Layer 3 specification; Core network protocols; Stage 3 (3GPP TS24.008 version 10.6.1 Release 10), Mar. 2012, pp. 1-649.
3GPP TS 23.402 V11.3.0, "3$^{rd}$ Generation Partnership Project; Technical Specification Group Services and System Aspects; Architecture enhancements for non-3GPP accesses (Release 11)", Jun. 2012, pp. 1-252.

\* cited by examiner

DYNAMIC ACTIVATION OF ANDSF POLICIES

CROSS-REFERENCE TO PRIOR APPLICATIONS

This application is a U.S. National Stage Application under 35 U.S.C. §371 of International Application No. PCT/EP2013/065385 filed on Jul. 22, 2013, and claims benefit to European Patent Application No. EP 12177338.6 filed on Jul. 20, 2012. The International Application was published in English on Jan. 23, 2014 as WO 2014/013085 A2 under PCT Article 21(2).

FIELD

The present invention relates to a method and a system for managing ANDSF policies in a 3GPP access network.

In addition, the present invention relates to User Equipment for deployment in a 3GPP access network.

Abbreviations are used herein as follows:
3GPP $3^{rd}$ Generation Partnership Project
ANDSF Access Network Discovery and Selection Function
BBERF Bearer Binding and Event Reporting Function
CCA Credit Control Answer
DM Device Management
EMM EPS (Evolved Packet System) Mobility Management
GTP GPRS Tunneling Protocol
HPLMN Home PLMN
H-ANDSF Home ANDSF
IE Information Element
ISMP Inter-System Mobility Policy
ISRP Inter-System Routing Policy
MME Mobility Management Entity
MO Managed Object
MS Mobile Station
NAS Non-Access Stratum
OCS Online Charging System
OMA Open Mobile Alliance
QoS Quality of Service
PCEF Policy and Charging Enforcement Function
PCRF Policy and Charging Rules Function
PCO Protocol Configuration Options
PDN Packet Date Network
PGW PDN (Packet Data Network) Gateway
PLMN Public Land Mobile Network
PMIP Proxy Mobile IP
SGW Serving Gateway
UE User Equipment
WLAN Wireless Local Area Network
VPLMN Visited PLMN
V-ANDSF Visited ANDSF

BACKGROUND

In current 3GPP technology (as defined in 3GPP TS 23.402, "Architecture enhancements for non-3GPP accesses") ANDSF (Access Network Discovery and Selection Function) can provide policies to a mobile terminal (UE) in push or pull mode, as illustrated in FIG. 1 for the general roaming case. These policies control, among others, the offload from the 3GPP access(es) towards non-3GPP access(es)—mostly WLAN—in two variants: (a) seamless and (b) non-seamless offload; this relies on appropriate agreements between the 3GPP operator and non-3GPP operators. The provisioning of offload policies happens via a protocol based on OMA DM (as described in 3GPP TS 24.312, "Access Network Discovery and Selection Function (ANDSF) Management Object (MO)") and is assumed not to be a real-time process. However, there are several use cases which have been identified by the inventor where the usage of such policies should be controlled in (nearly) real-time:

1. Offload dependent on charging cycle: in some tariffs, after a certain volume threshold of volume (the so called $2^{nd}$ flat rate threshold) has been reached, the offload of traffic should be favored more than with a consumed volume below the threshold. Although the offload probably cannot be strict (coverage of WLAN is not wide and QoS may not suffice for some services) it is preferred to have a guaranteed and strict point in time, well synchronized with the charging system, so that users can also understand the tariff and its usage.

2. Overload situation: if the 3GPP access(es) is/are becoming overloaded, it is strongly preferred to apply policies resulting in more effective offload and for more users. This would benefit both users (as they can continue services which they otherwise could not) and the 3GPP operator (as s/he avoids bad image, complaints and churn or users). The special offload policies for overload need to be activated more or less in real time (ideally within a few seconds) for many users.

3. Gradual construction and provision of ANDSF (offload) policies, e.g. detecting patterns over time, location and usage: for practical reasons it could be desired NOT to activate policies immediately in such a process (although they then have already been delivered to the UE). At the same time it may not be possible or preferred to specify a fixed point in time when policies should become active (note that ANDSF policies of course can be specified with concrete time parameters). Rather, the operator may want to use a kind of activation trigger, on demand. It is noted that a delta mode of policy provisioning is possible only from OMA DM version 1.3 onwards (as of today 3GPP builds still on version 1.2).

4. Business needs, like the support for a marketing campaign where offload to non-3GPP access plays a role. This could be a bundling with services in any relationship to the non-3GPP access provider (e.g. a coffee-shop chain could offer local content which is accessible only via the associated local WLAN hotspots). As this requires quite some flexibility in configuration and control, a real-time activation of offload policies should support this case.

The problem with current technology is that (nearly) real-time activation of ANDSF policies is not possible and thus the above mentioned use cases cannot be supported.

SUMMARY

In an embodiment, the present invention provides a method for managing ANDSF policies in a 3GPP access network. ANDSF rules are defined and structured into sets of ANDSF policies. A set identifier is defined for each set of the ANDSF policies as an ANDSF Set-ID. The ANDSF Set-IDs are conveyed to targeted UEs via a 3GPP control plane. The sets of the ANDSF policies are provisioned to the targeted UEs. A respective one of the ANDSF Set-IDs is provided such that it is used by UE logic in order to apply the respective ANDSF policy.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
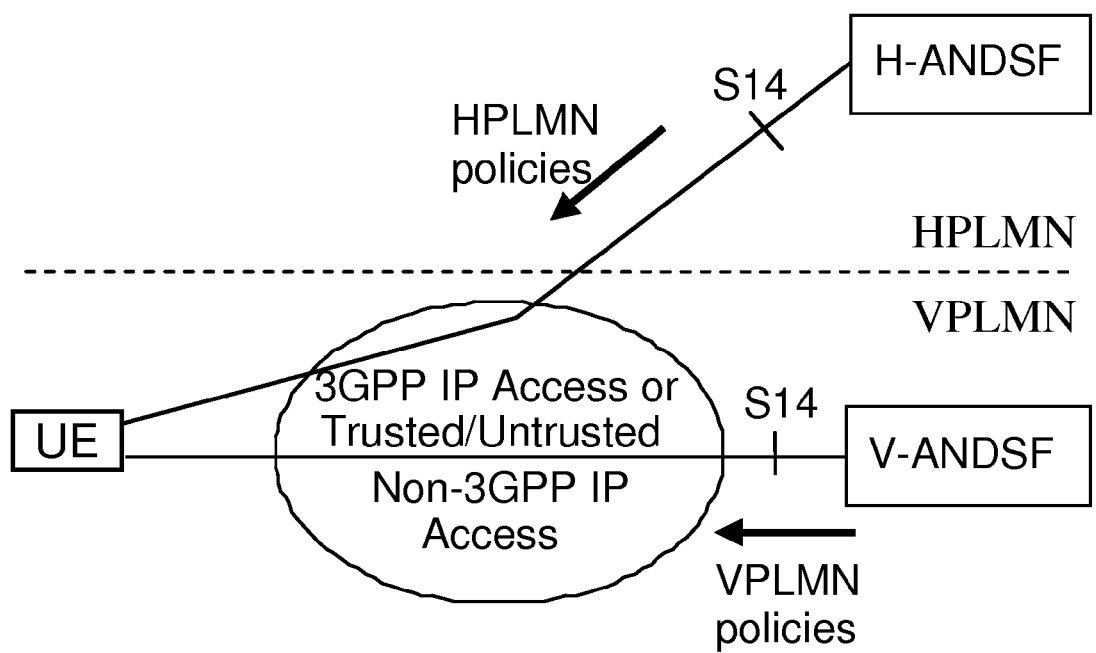
FIG. 1 is a schematic view illustrating ANDSF in a roaming case in a 3GPP architecture according to the prior art.

In an embodiment, the present invention improves and further develops a method and a system of the initially described type for managing ANDSF policies in a 3GGP access network, as well as User Equipment for deployment in a 3GGP access network, in such a way that a real-time or at least a nearly real-time activation of ANDSF policies becomes possible.

In accordance with an embodiment of the invention, the aforementioned benefits are achieved by a method comprising the steps of:

defining ANDSF rules and structuring them into sets of ANDSF policies, defining for each ANDSF policy set a set identifier—ANDSF Set-ID—and conveying said ANDSF Set-IDs to targeted UEs via the 3GPP control plane, provisioning of ANDSF policy sets to targeted UEs, and using of an ANDSF Set-ID by the UE logic in order to apply the respective ANDSF policy.

Furthermore, the above mentioned benefits are provided for in an embodiment of the invention by a system comprising a network entity, in particular an ANDSF server, that is configured to:

define ANDSF rules and to structure them into sets of ANDSF policies, define for each ANDSF policy set a set identifier—ANDSF Set-ID—and to convey said ANDSF Set-IDs to targeted UEs via the 3GPP control plane, and provision ANDSF policy sets to targeted UEs.

Still further, the above mentioned benefits are provided for in an embodiment of the invention by User Equipment configured to:

receive, in particular from an ANDSF server, ANDSF policy sets including an ANDSF Set-ID, receive via the 3GPP control plane in real-time or quasi real-time an ANDSF Set-ID, and apply the respective ANDSF policy corresponding to the received ANDSF Set-ID.

According to an embodiment of the present invention, it has been recognized that the above mentioned benefits can be achieved by introducing ANDSF Set-IDs that identify preconfigured ANDSF policy sets and that are transmitted to targeted UEs via control plane signaling in order to indicate the UEs in (nearly) real-time which ANDSF policy set to apply.

Insofar, an embodiment of the present invention provides a design of a dynamic control mechanism for highly dynamic (quasi real-time) ANDSF policy activation. By applying a method in accordance with an embodiment of the present invention, new use cases can be supported and traffic offload can be optimized.

According to a preferred embodiment, it may be provided that the provisioning of the ANDSF policy sets to targeted UEs is performed in non-real time, i.e. any set will be provided well before it is to be used by a particular UE. Basically, the provisioning step may be realized based on existing methods, for instance by using a protocol based on OMA DM (as described in 3GPP TS 24.312, "Access Network Discovery and Selection Function (ANDSF) Management Object (MO)") via the S14 interface. The real-time character of the process may be achieved by conveying ANDSF Set-IDs in the 3GPP control plane in real time or quasi real-time.

According to further preferred embodiments ANDSF Set-IDs are pre-configured in the ANDSF server. This (offline) configuration of ANDSF Set-IDs may be performed one time as an overall preparation step. It is noted that this preparation step may be extended to configure the ANDSF Set-IDs both in the ANDSF server and PCRF/OCS.

In order to easily link ANDSF rules with ANDSF Set-IDs and may be provided that the ANDSF rules within the ANDSF OMA DM MO are extended by including the corresponding ANDSF Set-ID as a leaf in the data (sub)tree.

With respect to the definition of ANDSF Set-IDs it may be provided that the meaning of the ANDSF Set-IDs remains operator specific. For instance, building on the use cases outlined above, the following scheme may be implemented:

| ANDSF Set-ID Value | Meaning |
|---|---|
| 0 | Default |
| 1 . . . 9 | charging cycle |
| 10 . . . 19 | (over)load levels |
| 21 . . . 29 | Related to incrementally detected data sets corresponding to user behaviour (e.g. 21 is normal, 22 commuting state etc.) |
| 31 . . . 39 | Marketing campaigns (e.g. 31 is Starbuck's spring campaign, 32 is EURO 2012 campaign with McDonalds, etc.) |

As an alternative to an operator specific definition, such values may be standardized.

With respect to efficient signaling of the ANDSF Set-IDs it may be provided that the ANDSF Set-IDs are included within a policy rule provided from PCRF via Gx to PCEF/PGW. In particular, the ANDSF Set-IDs could be coded within a Credit Control Answer (CCA), for instance according to the following enhancement of policy rules on Gx (CCA extension):

```
<CC-Request> ::= < Diameter Header: 272, REQ, PXY >
    < Session-Id >
    { Auth-Application-Id }
    { Origin-Host }
    { Origin-Realm }
    { Destination-Realm }
    { CC-Request-Type }
    { CC-Request-Number }
    [ Destination-Host ]
```

-continued

```
[ Origin-State-Id ]
*[ Subscription-Id ]
*[ Supported-Features ]
[ TDF-Information ]
[ Network-Request-Support ]
... ...
[ Routing-Rule-Install ]
[ Routing-Rule-Remove ]
[ Maximum-Bandwidth ]
[ ANDSF Set-ID ]
[ Logical-Access-ID ]
[ Physical-Access-ID ]
*[ Proxy-Info ]
*[ Route-Record ]
*[ AVP ]
```

It is noted that in the opposite direction, i.e. for reporting back the ANDSF Set-ID currently used by a UE, a corresponding extension can be applied in the Credit Control Request (CCR) message.

With respect to seamless and efficient further transport of the ANDSF Set-IDs via the 3GPP control plane from PGW to SGW and/or from SGW to MME, the signaling may be realized by including the ANDSF Set-IDs within PCO and/or PMIP signaling. More specifically, the ANDSF Set-IDs can be included within PCO in GTP-C and PMIP signaling along S5/S8 from PGW to SGW, and in GTP-C also along S11 from SGW to MME. For being signaled via the 3GPP control plane from MME to targeted UEs, according to preferred embodiments the ANDSF Set-IDs are included within NAS signaling.

For usage of PCO in NAS signaling, which is described in the standard document 3GPP TS 24.008, "Mobile radio interface Layer 3 specification; Core network protocols; Stage 3" and which a skilled artisan is therefore assumed to be familiar with, the following changes/enhancements (indicated in boldface printing) of the standard procedure (see Table 10.5.154 of the standard document) may be implemented (it is noted that the term "MS" in the cited document is equivalent to the term "UE" used here):

"MS to network direction:
  0001H (P-CSCF IPv6 Address Request);
  0002H (IM CN Subsystem Signaling Flag); . . .
  000FH (IFOM-Support-Request);
  0010H (IPv4 Link MTU Request);
  0011H (ANDSF Set-ID); and
  FF00H to FFFFH reserved for operator specific use.
Network to MS Direction:
  0001H (P-CSCF IPv6 Address);
  0002H (IM CN Subsystem Signaling Flag);
  . . .
  000FH (IFOM-Support);
  0010H (IPv4 Link MTU);
  0011H (ANDSF Set-ID); and
  FF00H to FFFFH reserved for operator specific use.
When the container identifier indicates ANDSF Set-ID, the container identifier contents field encodes an integer number of one byte."

According to another preferred embodiment the ANDSF Set-IDs may be transported via the 3GPP control plane by using dedicated new IEs in appropriate signaling messages. Across S5/S8 and S11 this could be in GTP-C signaling (Create Session, Modify Bearer, Update Bearer, etc.). Analogously, for the PMIP based architecture, the ANDSF Set-ID could be transported across Gxc directly from PCRF to BBERF/SGW (similar to above definition for Gx), from where it would be again conveyed via S11 in GTP-C protocol. Along the NAS signaling path (from MME to UE) suitable signaling messages/procedures would be EMM at any time, ATTACH or DETACH (e.g. during handovers) or TAU (e.g. for above described use cases 2 and 3, as they can depend on location).

According to another preferred embodiment the ANDSF Set-IDs may be provisioned as subscription data in HSS. In this case, the ANDSF Set-IDs may be delivered from HSS to MME, with further transport to the UE via NAS protocol as described about. The necessary extensions in data structure and signaling protocol are straightforward to anybody skilled in the art and are thus not described further.

Advantageously, the ANDSF Set-ID currently used by a UE may be notified in the direction from UE/MS to the network, i.e. to MME and its backend, for the purpose of resolving unsynchronized states. The notification may be performed in an unsolicited manner or may by requested from the network. According to a preferred embodiment, the first option could take place, e.g., when the UE had been instructed previously by the network to use an ANDSF Set-ID, but the corresponding policy information is no longer provisioned to the UE, and the UE falls back to the default Set-ID. The second option could be useful if the network, i.e. MME and its backend, have lost the corresponding state.

According to further preferred embodiments, the activation and/or deactivation of a particular ANDSF Set-ID may be performed manually or may be triggered automatically. The latter case proves to be beneficial, for instance, in connection with the first use case described in the introduction above. The trigger may be provided, e.g., by OCS or by another backend system.

FIG. 1, which is derived from FIG. 4.8.1.1-2 of document 3GPP TS 23.402, "Architecture enhancements for non-3GPP accesses", illustrates the roaming architecture for ANDSFs according to the standard. Generally, ANDSF policies are important in cases in which UEs have the possibility to choose between 3GPP accesses and non-3GPP accesses or between multiple non-3GPP accesses. In these cases, ANDSF policies can control, e.g., the offload from 3GPP access to available non-3GPP accesses. To this end, the ANDSF contains data management and control functionality necessary to provide network discovery and selection assistance data as per operators' policy. The ANDSF shall respond to UE requests for access network discovery information (pull mode operation) and may be able to initiate data transfer to the UE (push mode operation), based on network triggers or as a result of previous communication with the UE.

In the roaming scenario of FIG. 1, an ANDSF element located in the home PLMN (HPLMN) of a UE is referred to as the Home-ANDSF (H-ANDSF) for this UE, whereas an ANDSF element located in the visited PLMN (VPLMN) of a UE is referred to as the Visited-ANDSF (V-ANDSF) for this UE. Hereinafter, the term ANDSF is used to refer to both an H-ANDSF and a V-ANDSF. Further details can be obtained from the above-mentioned standardization document. In any case, for the understanding of the present invention, it is important to note that with the standard technology it is currently not possible to activate ANDSF policies in the UE in real-time or quasi real-time which, however, the present invention recognizes is actually desirable in various scenarios, e.g. in case of offloads dependent on charging cycles, overload situations or in connection with supporting certain marketing campaigns.

Figure 2:
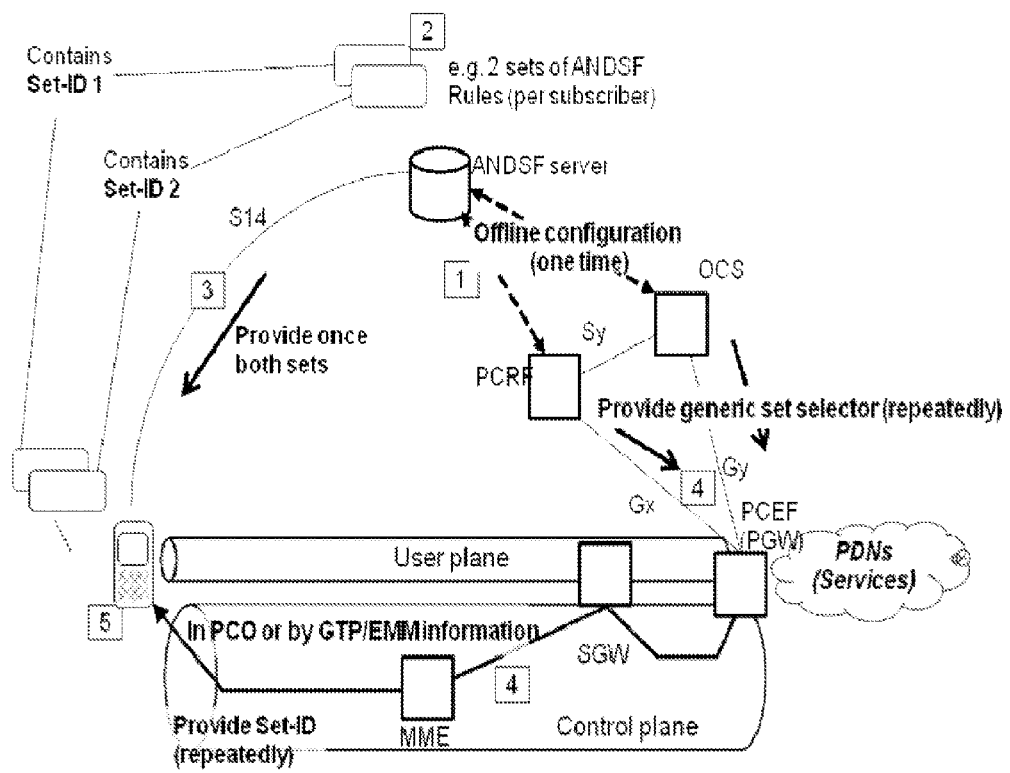
FIG. 2 is a schematic view illustrating a method for dynamic activation of ANDSF policies in accordance with an embodiment of the present invention.

FIG. 2 illustrates an embodiment of the present invention that overcomes the above described limitation and that enables real-time or at least nearly real-time activation of ANDSF policies in the UE. In the illustrated embodiment, which relates to the provision of two different ANDSF policy sets, the following building blocks are implemented:

1. Offline configuration (and alignment) of ANDSF Set-IDs in both ANDSF server and PCRF/OCS, as an overall preparation step.
2. Structuring of ANDSF policies into sets and definition of an individual set identifier (ANDSF Set-ID) for each ANDSF policy set. The ANDSF policy rules are also extended by including the ANDSF Set-ID as a leaf in the data (sub)tree of the ANDSF OMA DM MO. A preferred solution for inserting the ANDSF Set-ID into the ANDSF policy data structure is described below in connection with FIG. 3
3. Provision of ANDSF policy sets to UE in non-real time, i.e. provide any set well before it is to be used by the UE. This step can be executed based on existing methods.
4. Conveyance of ANDSF Set-ID in the 3GPP control plane, i.e. between PCRF/OCS, PCEF/BBERF, MME and all targeted UEs. This step can be executed in (nearly) real.
5. Usage of ANDSF Set-ID by the UE logic in order to evaluate/apply the appropriate policy. This can be realized by performing a slight enhancement in 3GPP TS 24.302, "Access to the 3GPP Evolved Packet Core (EPC) via non-3GPP access networks; Stage 3" or/and 3GPP TS 23.312, "Access Network Discovery and Selection Function (ANDSF) Management Object (MO)", describing that the ANDSF Set-ID leaf is included in the determination of the active rule. The usage of policies corresponding to the default ANDSF Set-ID (e.g. in error cases) can be described as well.

Figure 3:
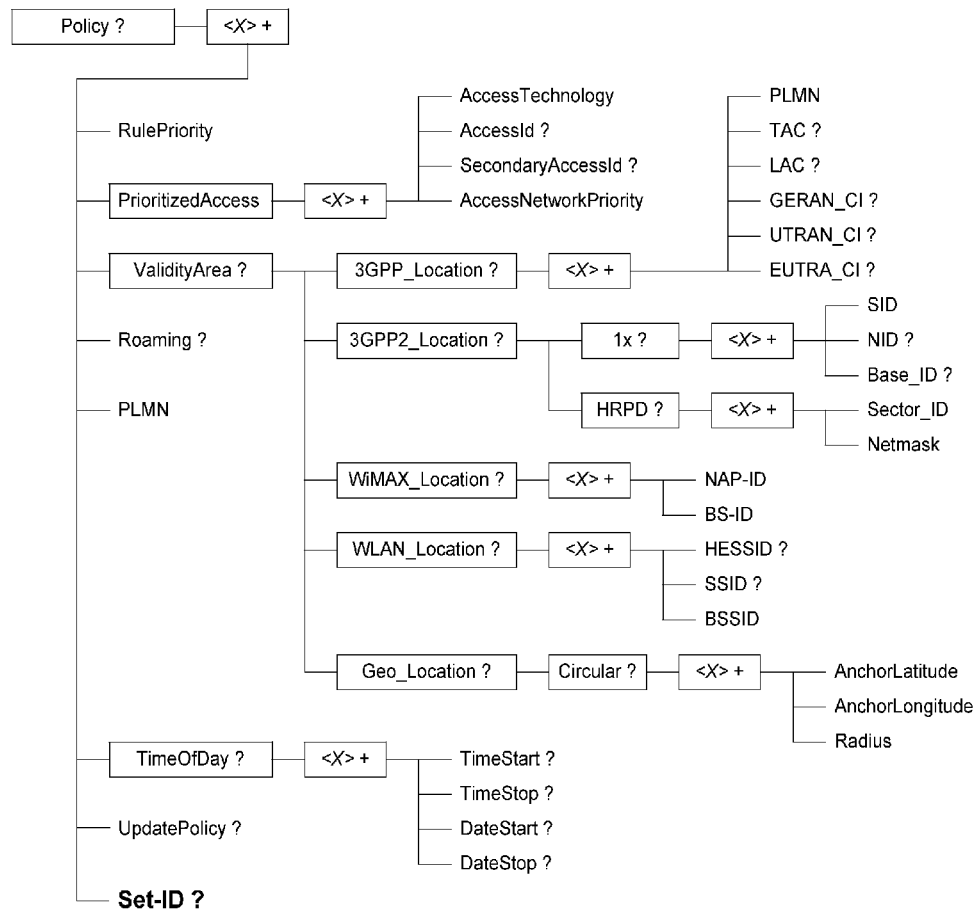
FIG. 3 is a diagram illustrating an enhancement of ANDSF policies with a Set-ID in accordance with an embodiment of the present invention.

FIG. 3 relates to the specification of the OMA DM MO, as described in 3GPP TS 24.312, "Access Network Discovery and Selection Function (ANDSF) Management Object (MO)", and basically corresponds to FIG. 4.2.2 of this document. However, as an enhancement of the standard specification, according to an embodiment of the present invention the ISMP part of ANDSF data is extended with an ANDSF Set-ID. It is noted that a similar extension can be made easily for parts related to discovery information and ISRP. As will be appreciated by those skilled in the art, the ANDSF Set-ID can be inserted at any other place different from the one illustrated in the embodiment of FIG. 3 within the data tree.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for managing Access Network Discovery and Selection Function (ANDSF) policies in an access network, the method comprising:
    defining ANDSF rules;
    structuring the ANDSF rules into sets of ANDSF policies;
    defining an ANDSF Set-ID for each of the sets of ANDSF policies;
    provisioning the sets of the ANDSF policies to user equipments (UEs); and
    transmitting a selected ANDSF Set-ID to at least one targeted UE via a network control plane in order to trigger at least one of activation or deactivation, at the at least one targeted UE, of a set of ANDSF policies corresponding to the selected ANDSF Set-ID.

2. The method according to claim 1, wherein the provisioning of the sets of the ANDSF policies to the UEs is performed in non-real time.

3. The method according to claim 1, wherein the transmitting the selected ANDSF Set-ID to the at least one targeted UE via the network control plane is performed in real time or quasi real-time.

4. The method according to claim 1, wherein the ANDSF Set-IDs are configured in an overall preparation step at an ANDSF server.

5. The method according to claim 1, wherein the ANDSF rules definition is extended by including the corresponding ANDSF Set-IDs as a leaf in a data subtree or a data tree.

6. The method according to claim 1, wherein a meaning of each of the respective ANDSF Set-IDs is defined in an operator specific way.

7. The method according to claim 1, wherein the transmitting the selected ANDSF Set-ID to the at least one targeted UE via the network control plane comprises encoding the selected ANDSF Set-ID in a message from a Policy and Charging Rules Function (PCRF) to at least one of a Policy and Charging Enforcement Function (PCEF) or a Packet Data Network (PDN) Gateway (PGW).

8. The method according to claim 1, wherein the transmitting the selected ANDSF Set-ID to the at least one targeted UE via the network control plane comprises including the selected ANDSF Set-ID within Protocol Configuration Options (PCO) signaling or Proxy Mobile IP (PMIP) signaling from a Packet Data Network (PDN) Gateway (PGW) to a Serving Gateway (SGW) or from the SGW to a Mobility Management Entity (MME).

9. The method according to claim 1, wherein the transmitting the selected ANDSF Set-ID to the at least one targeted UE via the network control plane comprises including the selected ANDSF Set-ID within Non-Access Stratum (NAS signaling).

10. The method according to claim 1, wherein the transmitting the selected ANDSF Set-ID to the at least one targeted UE via the network control plane comprises using dedicated new Information Elements (IEs) in appropriate signaling messages.

11. The method according to claim 1, wherein the ANDSF Set-IDs are provisioned as subscription data in HSS.

12. The method according to claim 1, further comprising receiving a currently used ANDSF Set-ID corresponding to a set of ANDSF policies currently used by the at least one targeted UE for the purpose of resolving unsynchronized states.

13. The method according to claim 12, wherein the receiving the currently used ANDSF Set-ID corresponding to the set of ANDSF policies currently used by the at least one targeted UE is unsolicited or by request from the network.

14. The method according claim 1, wherein triggering at least one of activation and deactivation of the set of ANDSF policies corresponding to the selected ANDSF Set-ID is performed manually or automatically.

15. A system for managing Access Network Discovery and Selection Function (ANDSF) policies in an access network, the system comprising:
  an ANDSF server configured to:
    define ANDSF rules,
    structure the ANDSF rules into sets of ANDSF policies,
    define an ANDSF Set-ID for each of the sets of ANDSF policies,
    provision the sets of the ANDSF policies to one or more user equipments (UEs), and
    transmit a selected ANDSF Set-ID to at least one targeted UE via a network control plane in order to trigger at least one of activation or deactivation, at the at least one targeted UE, of a set of ANDSF policies corresponding to the selected ANDSF Set-ID.

16. A User Equipment (UE) for deployment in an access network, wherein the UE is configured to:
  receive sets of ANDSF policies from an ANDSF server,
  receive a selected ANDSF Set-ID via a network control plane in real-time or quasi real-time, and
  apply a respective one of the sets of ANDSF policies corresponding to the selected ANDSF Set-ID,
  wherein each of the sets of ANDSF policies are structured by the ANDSF server and includes ANDSF rules defined by the ANDSF server.

* * * * *